US012678643B2

(12) United States Patent
Robinson et al.

(10) Patent No.: US 12,678,643 B2
(45) Date of Patent: Jul. 14, 2026

(54) FIRE EXTINGUISHING SYSTEM

(71) Applicants: Joshua Matthew Robinson, Delaware, OH (US); William Robert Johnson, Westerville, OH (US); Lincoln Robert Hennell, Sparta, OH (US)

(72) Inventors: Joshua Matthew Robinson, Delaware, OH (US); William Robert Johnson, Westerville, OH (US); Lincoln Robert Hennell, Sparta, OH (US)

( * ) Notice: Subject to any disclaimer, the term of this patent is extended or adjusted under 35 U.S.C. 154(b) by 183 days.

(21) Appl. No.: 18/740,806

(22) Filed: Jun. 12, 2024

(65) Prior Publication Data

US 2024/0416161 A1 Dec. 19, 2024

Related U.S. Application Data

(60) Provisional application No. 63/521,563, filed on Jun. 16, 2023.

(51) Int. Cl.
*A62C 3/00* (2006.01)
*A62C 35/13* (2006.01)

(52) U.S. Cl.
CPC .............. *A62C 3/006* (2013.01); *A62C 35/13* (2013.01)

(58) Field of Classification Search
CPC ........... A62C 3/006; A62C 3/008; A62C 3/16; A62C 13/003; A62C 13/006; A62C 13/76; A62C 35/13; A62C 99/0045
See application file for complete search history.

(56) References Cited

U.S. PATENT DOCUMENTS

| | | | | |
|---|---|---|---|---|
| 1,208,548 A * | 12/1916 | Haller | A62C 35/605 | 169/29 |
| 1,451,915 A * | 4/1923 | Ladd-Davis | A62C 35/605 | 169/29 |
| 3,870,105 A * | 3/1975 | Gooch | A62C 13/003 | 222/386 |
| 4,011,911 A * | 3/1977 | Gow | A62C 35/04 | 169/29 |
| 5,315,292 A * | 5/1994 | Prior | A62C 37/38 | 169/61 |
| 5,486,811 A * | 1/1996 | Wehrle | G08B 29/183 | 340/517 |
| 6,105,677 A * | 8/2000 | Stager | A62C 37/12 | 239/524 |
| 6,244,353 B1 * | 6/2001 | Greer | A62C 3/008 | 169/37 |
| 9,044,627 B1 * | 6/2015 | Williams | A62C 3/006 | |
| 9,849,315 B2 * | 12/2017 | Scarola | A62C 35/02 | |

* cited by examiner

*Primary Examiner* — Darren W Gorman
(74) *Attorney, Agent, or Firm* — TUCKER ELLIS LLP

(57) ABSTRACT

A fire extinguishing system is provided, which includes: a housing having an opening; a movable door coupled to the housing to cover the opening; a hopper configured to store a fire extinguishing agent, the hopper having a hopper outlet; a movable gate coupled to the hopper to cover the hopper outlet; an expeller coupled to the hopper, the expeller having an expeller outlet; a fan coupled to the expeller; and a controller, the controller configured to activate a fire extinguishing sequence. The fire extinguishing sequence includes: moving the door to uncover the opening; moving the gate to uncover the hopper outlet; and activating the fan.

19 Claims, 7 Drawing Sheets

FIRE EXTINGUISHING SYSTEM

CROSS REFERENCE TO RELATED APPLICATIONS

This application claims the benefit of U.S. Provisional Patent Application No. 63/521,563, filed on Jun. 16, 2023 and entitled Fire Extinguisher, the entire disclosure of which is incorporated herein by reference.

TECHNICAL FIELD

The present invention relates to fire extinguishing system, and more particularly relates to a portable fire extinguishing system that can be positioned near a cooking device such as a kitchen range or stove.

BACKGROUND

Fire extinguishers installed proximate a cooking device are typically bulky, not aesthetically appealing, and expensive. Such systems often store a fire extinguishing compound in a container remotely located from where the agent is dispersed. Thus, the fire extinguishing compound is then transported from the storage container through a system, such as a piping arrangement, to a spraying device for dispersion of the compound onto the cooking device.

Additionally, such systems typically require a significant amount of time for installation and have significant expense over and above what is required to install the range or stove itself. This is due to the elaborate piping needed to transport the fire extinguishing compound from the storage container to the spraying device. Moreover, these prior art fire extinguishing devices also have the drawback that as the distance between the storage container and the spraying device (e.g. nozzles) is increased, a greater force is required to project the fire extinguishing compound. Therefore, a larger storage container and supply of fire extinguishing compound are needed.

Such systems also tend to detract from a kitchen's appearance. In addition to the unsightly appearance of the storage container and the piping, the spray device (i.e., nozzle) which projects the fire extinguishing compound typically extends downward from the range hood to better direct the fire extinguishing compound. This not only detracts from the appearance of the kitchen but also interferes with the use of the cooktop.

Conventional portable fire extinguishers are generally stored away due to their unattractive appearance. Thus, when needed, a user must retrieve the fire extinguisher and manually activate it to release an extinguishing agent towards a fire.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to one example of the present disclosure, a fire extinguishing system is provided. The fire extinguishing system includes: a housing; a hopper provided within the housing, the hopper configured to hold a fire extinguishing agent therein; and an expeller positioned within the housing proximate the hopper, the expeller configured to receive the fire extinguishing agent from the hopper and discharge the fire extinguishing agent through an opening in the expeller.

According to another example of the present disclosure, a fire extinguishing system is provided. The fire extinguishing system includes: a housing having an opening in a sidewall; a movable door coupled to the housing to cover the opening; a hopper configured to store a fire extinguishing agent, the hopper having a hopper outlet; a movable gate coupled to the hopper to cover the hopper outlet; an expeller coupled to the hopper, the expeller having an expeller outlet; a fan coupled to the expeller; and a controller, the controller configured to activate a fire extinguishing sequence, wherein the fire extinguishing sequence includes: moving the door to uncover the opening; moving the gate to uncover the hopper outlet; and activating the fan.

According to another example of the present disclosure, a fire extinguishing system is provided. The fire extinguishing system includes: a fan assembly; an expeller having a first end coupled to the fan assembly and an outlet positioned at a second end, the second end being opposite the fan assembly; a hopper configured to store a fire extinguishing agent, the hopper fluidly connected to the expeller; and a housing, the housing having an opening that corresponds with the outlet of the expeller.

BRIEF DESCRIPTION OF THE DRAWINGS

Throughout the drawings and the detailed description, unless otherwise described, the same drawing reference numerals can be understood to refer to the same or similar elements, features, and structures. The relative size and depiction of these elements may be exaggerated for clarity, illustration, and convenience.

DETAILED DESCRIPTION OF THE PREFERRED EMBODIMENTS

The following descriptions of embodiments provides non-limiting representative examples to particularly describe features and teachings of different aspects of the invention. The embodiments described should be recognized as capable of implementation separately, or in combination, with other embodiments. A person of ordinary skill in the art reviewing the description of embodiments should be able to learn and understand the different described aspects of the systems and methods disclosed herein. The description of embodiments should facilitate understanding of the systems and methods to such an extent that other implementations, not specifically covered but within the knowledge of a person of skill in the art having read the description of embodiments, would be understood to be consistent with an application thereof.

The fire extinguishing systems are described herein as being designed for placement proximate a kitchen area, such as a stove, cooktop, or other cooking appliance. In kitchen environments, fires can start in many ways, such as by leaving cooking food unattended, letting cooking oils become too hot, or by leaving combustibles/flammable items too close to the cooking device. More than half of kitchen fires are started due to ignited cooking oil, fat, grease, butter, and other cooking substances. The embodiments shown and described herein are effective to quickly and automatically extinguish such fires, and in particular, grease fires. However, it is to be appreciated that the fire extinguishing systems described herein can be used in any suitable location having an increased risk of fire, such as near a home heating unit, in a garage, and the like.

Figure 2:
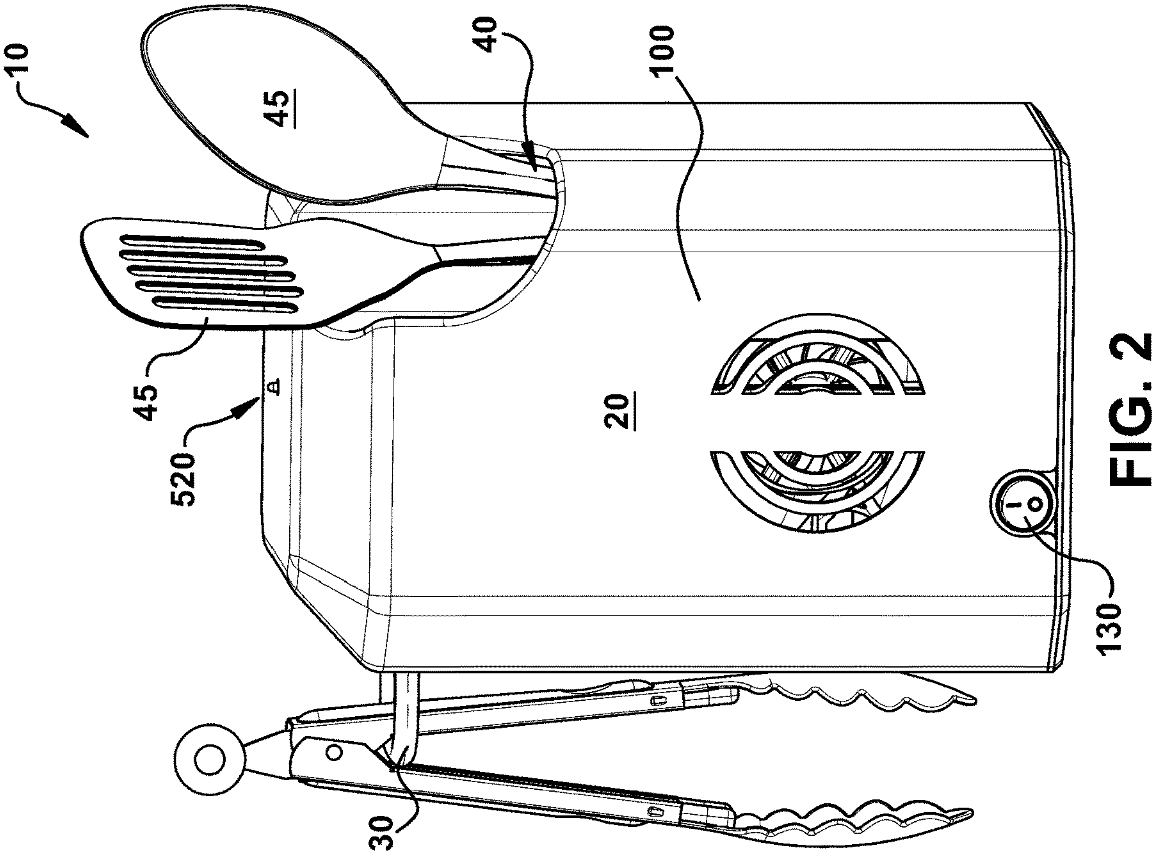
FIG. 2 illustrates a rear perspective view of a fire extinguishing system in accordance with an exemplary embodiment.
Figure 1:
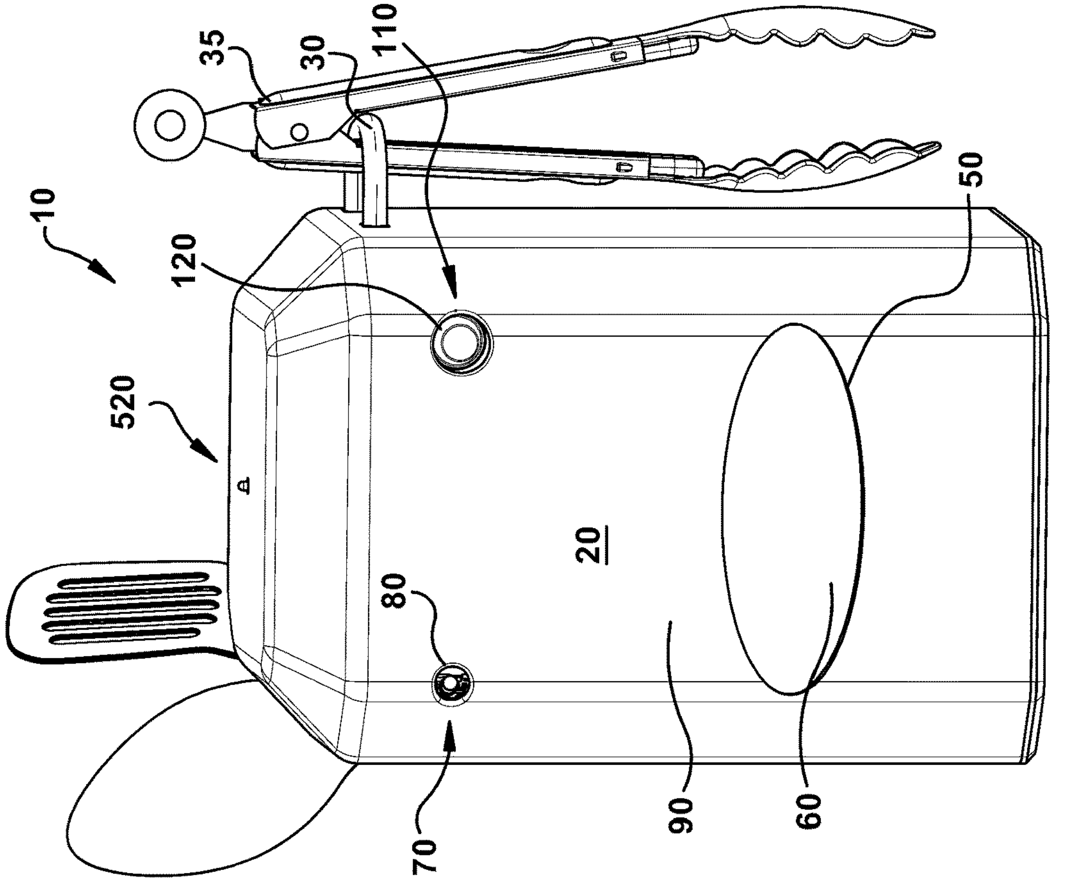
FIG. 1 illustrates a front perspective view of a fire extinguishing system in accordance with an exemplary embodiment.

Referring now to FIG. 1, a fire extinguishing system 10 is illustrated in accordance with one embodiment. The fire extinguishing system 10 can be a portable, self-contained, and automatic fire extinguisher. The fire extinguishing system 10 includes an enclosure, or housing, 20 that is compact and aesthetically pleasing. As will be described in greater detail below, the fire extinguishing system 10 can control and extinguish fires without human intervention. Accordingly, the fire extinguishing system 10 is configured to be positioned in a location directly proximate a fire hazard, such as on a countertop next to a cooking range. Thus, in the event of a fire, the fire extinguishing system 10 does not need to be located and carried to the fire location. The housing 20 can be made from a metal, flame retardant polymer, or any suitable material, such as sheet metal, fiberglass, and/or fluoropolymers, and can be of any desired color and shape. For instance, the housing 20 can be offered in a variety of designs to coordinate with a user's kitchen décor. Moreover, the housing 20 may include an inner housing and an outer housing, in which the inner housing is configured to contain the components of the fire extinguishing system 10 and the outer housing is decorative such that a user can change the outer housing to modify a color, shape, and/or design of the fire extinguishing system 10 as desired. The housing 20 can also be configured to hold one or more kitchen utensils. As shown in FIGS. 1 and 2, the housing 20 can include at least one attachment portion 30, such as a u-shaped projection over which one or more first utensils 35, such as tongs, can hang. The attachment portion(s) can also include a hook, rod, groove, latch, bracket, or any other suitable attachment. The housing 20 can alternatively, or additionally, include a receptacle 40 for holding one or more second utensils 45, such as a cooking spoon and/or spatula. Thus, in addition to providing an aesthetically pleasing safety device for the kitchen, the fire extinguishing system 10 can also provide day-to-day utility.

The housing 20 includes at least one opening 50 that extends through a sidewall of the housing 20. The opening 50 can be closed by a moveable door 60 or cover member when the fire extinguishing system 10 is in its normal state. When a fire is detected, the door 60 moves from a closed position to an open position, which allows a fire extinguishing agent to be discharged from the at least one opening 50 for smothering a fire, such as a grease fire. A wide variety of fire suppression and fire extinguishing compounds may be used as the fire extinguishing agent. For instance, the fire extinguishing agent can include sodium bicarbonate or flour, as both are widely available, environmentally friendly, and non-toxic. However, other suitable materials can be used, for example, clean agent gasses, such as CO2 or fluids designed for cooking fires, such as Ansul LVS NF-40.

The fire extinguishing system 10 is equipped at least one sensor, preferably a plurality of sensors, that can detect flame and smoke. The sensors are positioned at a height sufficient to detect flame and smoke caused by a fire, such as a cooking fire, but will not be triggered by a normal flame height, such as one emitted by a gas burner during a cooking operation. For example, the fire extinguishing system 10 can include at least one optical flame detector 70, such as an infrared (IR) flame sensor, that can detect and respond to the presence of a flame or fire. A first sensor aperture 80 is provided through a top portion of the housing 20 and can be proximate the opening 50. As shown in FIGS. 1 and 2, the housing 20 can include a plurality of side walls, such as first side wall 90 and second side wall 100. The opening 50 is provided through a portion of the first side wall 90, such as at a lower middle portion, and the first sensor aperture 80 is provided through another portion of the first side wall 90, such as at an upper portion. The optical flame detector 70 is positioned proximate the first sensor aperture 80 such that the optical flame detector 70 is configured to detect the presence of a flame outside the housing 20 via the first sensor aperture 80. Specifically, the optical flame detector 70 includes one or more sensors that look for specific frequencies of ultraviolet (UV) and/or IR radiation. The fire extinguishing system 10 can also include at least one gas detector 110, such as a smoke detector, that can detect oxygen depletion and/or the presence of toxic or combustible gases. The gas detector 110 can extend through or be positioned proximate a second sensor aperture 120 provided through the housing 20. As shown in FIG. 1, the second sensor aperture 120 can be provided through the second side wall 90, at a substantially similar height as the first sensor aperture 80. The gas detector 110 is thus configured to detect the presence of smoke, toxic, and/or combustible gases outside the housing 20 via the second sensor aperture 120.

Figure 3:
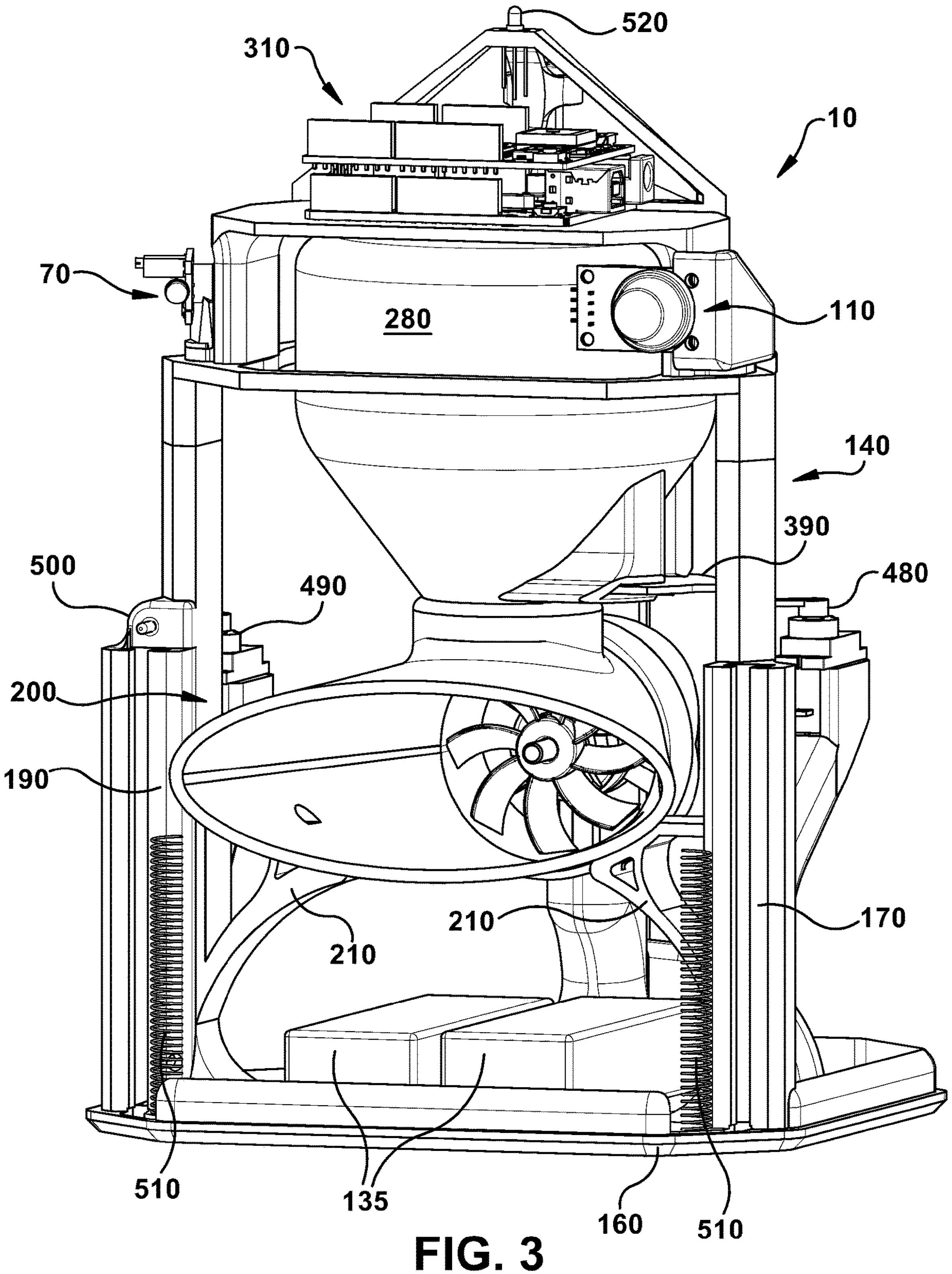
FIG. 3 illustrates a front perspective view of a fire extinguishing system with an outer housing removed in accordance with an exemplary embodiment.
Figure 4:
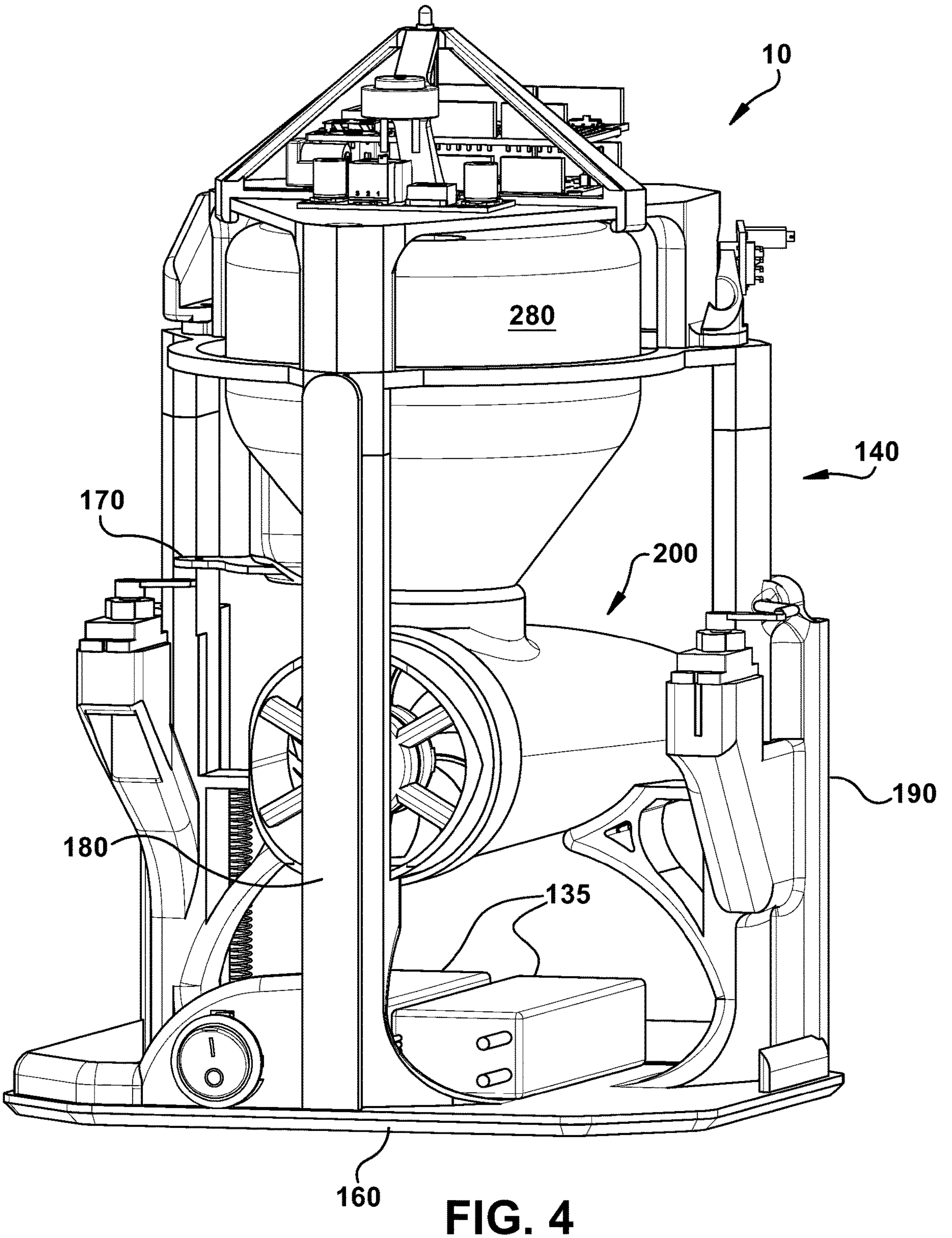
FIG. 4 illustrates a rear perspective view of a fire extinguishing system with an outer housing removed in accordance with an exemplary embodiment.

As shown in FIG. 2, the fire extinguishing system 10 can include an on/off switch 130 to mitigate inadvertent release of the fire extinguishing agent should the fire extinguishing system 10 unintentionally activate. The fire extinguishing system 10 can be battery powered, such as by one or more rechargeable batteries (e.g., lithium polymer drone batteries) or replaceable batteries (e.g., D-cell batteries) 135 (FIGS. 3-4). It is desirable to use large capacity, low self-discharge, and high maximum discharge rate batteries. In order to preserve battery life, the fire extinguishing system 10 could enter a low power deep sleep mode in which the fire extinguishing system 10 will sit idle. When flames and/or smoke/gas are detected by the optical flame detector 70 and/or gas detector 110, the fire extinguishing system 10 will awaken to extinguish the fire. This allows the fire extinguishing system 10 to operate from the batteries for an extended period of time before the batteries need to be recharged or replaced. The fire extinguishing system 10 may also or alternatively include a power cable (not shown).

Figure 5:
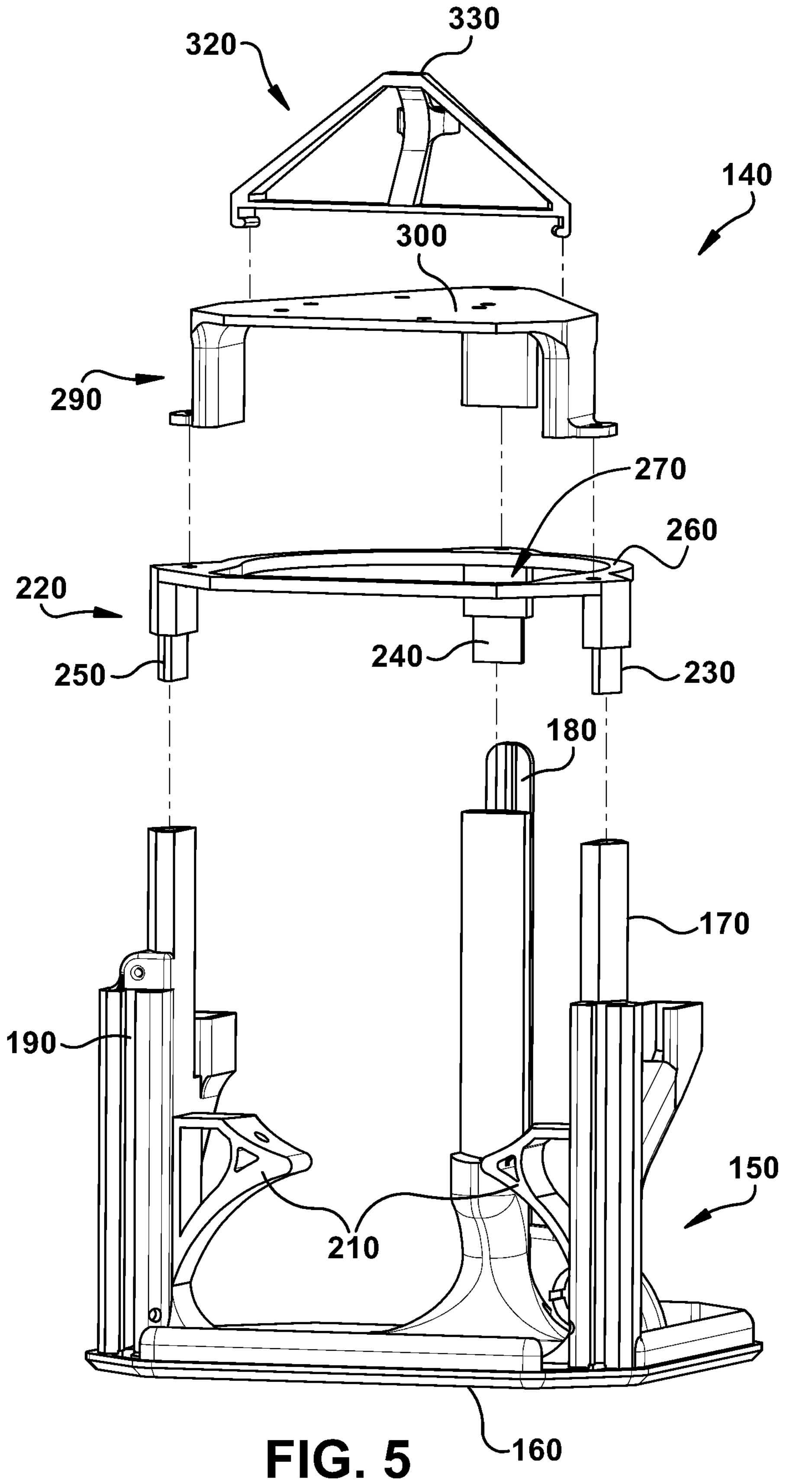
FIG. 5 illustrates an exploded view of a frame assembly for a fire extinguishing system in accordance with an exemplary embodiment.

Turning now to FIG. 3 and FIG. 4, front and rear perspective views of the fire extinguishing system 10 are illustrated with the housing 20 removed. The fire extinguishing system 10 includes a frame assembly 140 for securing and supporting internal system components. An exploded view of the frame assembly 140 is shown in FIG. 5. Like the housing 20, the frame assembly 140 can be made from a metal, flame retardant polymer, or any suitable material, such as sheet metal, fiberglass, and/or fluoropolymers. The frame assembly 140 can include a plurality of interconnecting sections, each supporting various components of the fire extinguishing system 10. For example, as shown in the present embodiment, the frame assembly 140 includes a lower frame section 150, which includes a base portion 160 and a plurality of columns 170, 180, 190 extending upwardly from the base portion 160. The base portion 160 also includes a plurality of inwardly extending supports 210 for supporting an expeller 200, which will be described below. A first support platform 220 is coupled to the lower frame section 150. For instance, the first support platform 220 can include a plurality of legs, or downwardly extending projections, 230, 240, 250 that correspond with the plurality of columns 170, 180, 190 to secure the lower frame section 150 and the first support platform 220 together. The legs 230, 240, 250 can be joined with the columns 170, 180, 190 in a press fit or snap fit engagement or in any other suitable manner. The first support platform 220 includes a support surface 260 on which the one or more sensors, such as the optical flame detector(s) 70 and the gas detector(s) 110, can be supported. A hopper opening 270 extends through the support surface 260 so that an upper portion of a hopper 280 can extend therethrough. A second support platform 290 can be coupled to the support surface 160, such as via a snap fit, fastener connection, or the like. The second support platform includes an upper surface 300 configured to support a plurality of electrical components 310 of the fire extinguishing system 10. The electrical components 310 can include a microcontroller configured to operate the extinguishing sequence, which will be described below. The electrical components 310 can also include one or more alarms, such as a buzzer. An upper frame section 320 is coupled to the upper surface 300, such as via a snap fit, fastener connection, or the like, and includes an aperture 330 at a top portion of the upper frame section 320 configured to support and receive at least one light element, such as a light emitting diode (LED) 520.

Figure 6:
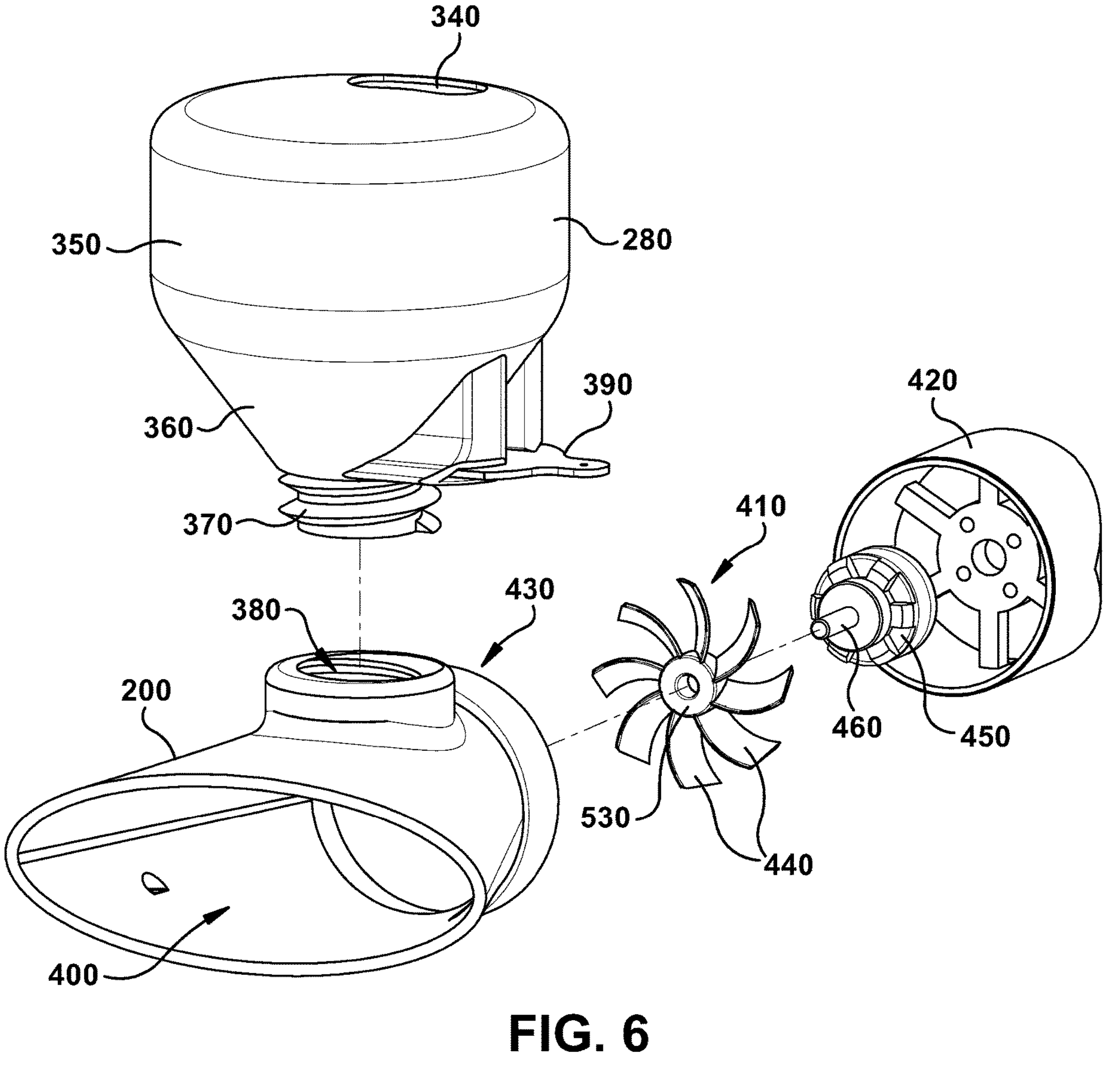
FIG. 6 illustrates an exploded view of a hopper and expeller assembly for a fire extinguishing system in accordance with an exemplary embodiment.

An exploded view of the hopper 280 and expeller 200 assembly, according to the present embodiment, are shown in FIG. 6. The hopper 280 is configured to store or hold an amount of the fire extinguishing agent therein. For instance, the hopper 280 can be sized to hold an amount of fire extinguishing agent suitable to fully suppress a kitchen grease fire. The hopper 280 includes a cylindrical storage body 350 fluidly connected to a funnel-shaped portion 360. A feed inlet or fill opening 340 can be positioned at a top portion of the cylindrical storage body 350 to receive the fire extinguishing agent. A hopper outlet 370 is provided at a bottom of the funnel-shaped portion 360. The hopper outlet 370 can be threaded for connection to an inlet 380 of the expeller 200. The inlet 380 of the expeller 200 corresponds with the discharge outlet 370 such that the fire extinguishing agent can flow from the hopper 280 into the expeller 200. A gate 390 is slidably positioned above the hopper outlet 370 and is configured to close or open the hopper outlet 370, thereby controlling whether the fire extinguishing agent can pass through the hopper outlet 370 or whether the fire extinguishing agent is retained within the hopper 280. Thus, when the gate 390 is moved to an open position, the fire extinguishing agent flows from the hopper 280 through the hopper outlet 370 and into the expeller 200 through the inlet 380.

The expeller 200 includes an expeller outlet 400 through which the fire extinguishing agent is discharged. A size and shape of the expeller outlet 400 corresponds with a size and shape of the opening 50 in the housing 20. In the present embodiment, the expeller outlet 400 has an ellipsoidal shape; however, it is to be appreciated that the expeller outlet 400 can be of any suitable shape. At an end of the expeller 200 opposite the expeller outlet 400 is an opening 430 for receiving a fan assembly 410. The fan assembly 410 includes a hub 530 and a plurality of fan blades 440 spaced circumferentially around and extending radially from the hub 530. An electric motor 450 is coupled to a first end of an axis 460, the other end of the axis 460 being couple to the hub 530. The fan assembly 410 is secured to the expeller 200 via a fan housing 420. The motor 450 can be a brushless DC motor or an AC motor and is configured to rotate the fan blades 440 to create a strong current operable to blow the fire extinguishing agent through the expeller 200 and through the opening 50 of the housing 20. The fan assembly 410 can blow the fire extinguishing agent at a desired speed and distance to extinguish a fire, such as to cover a cooktop of a cooking device in order to suppress any flames thereon.

Figure 7:
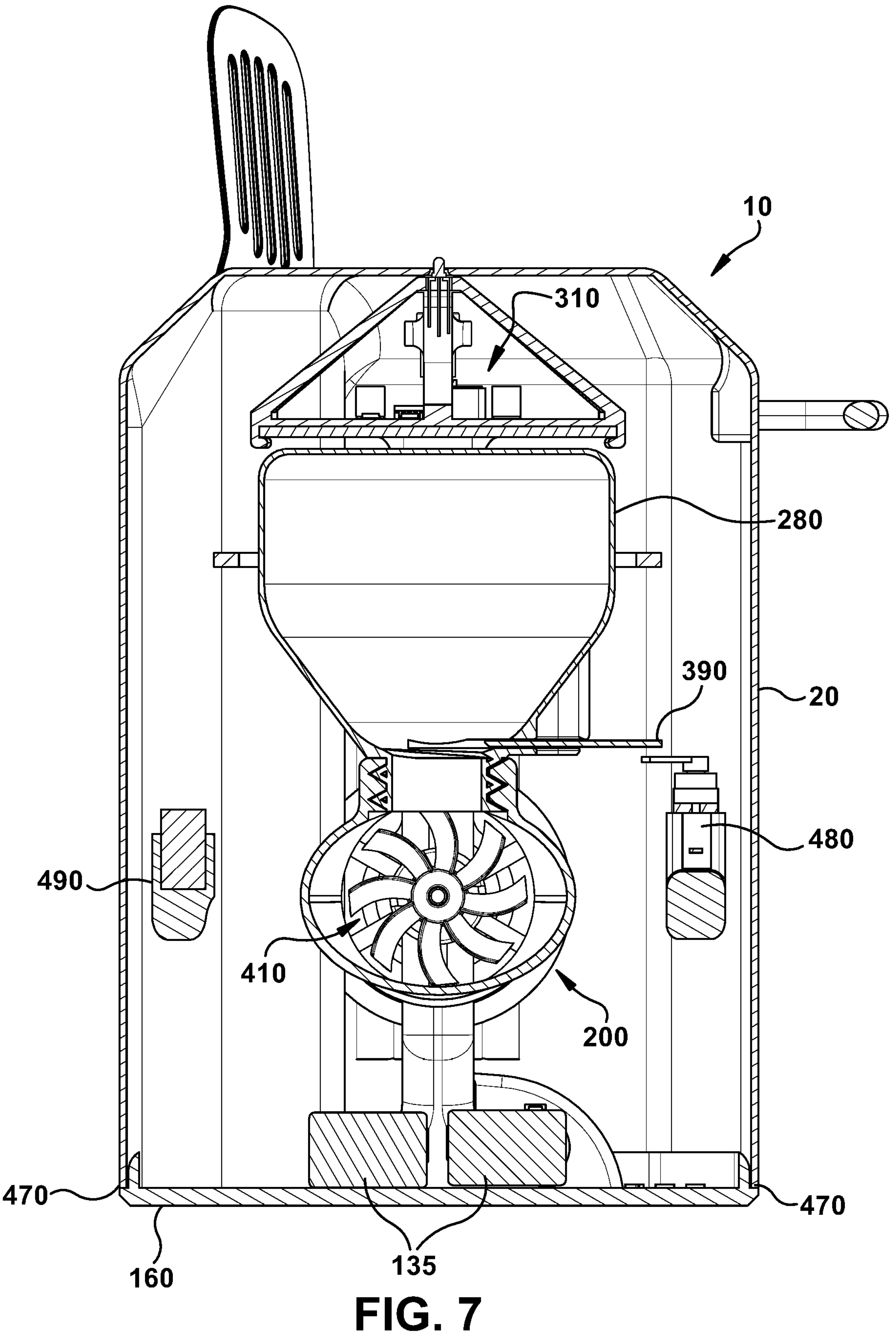
FIG. 7 illustrates a cross-sectional view of a fire extinguishing system in accordance with an exemplary embodiment.
Figure 8:
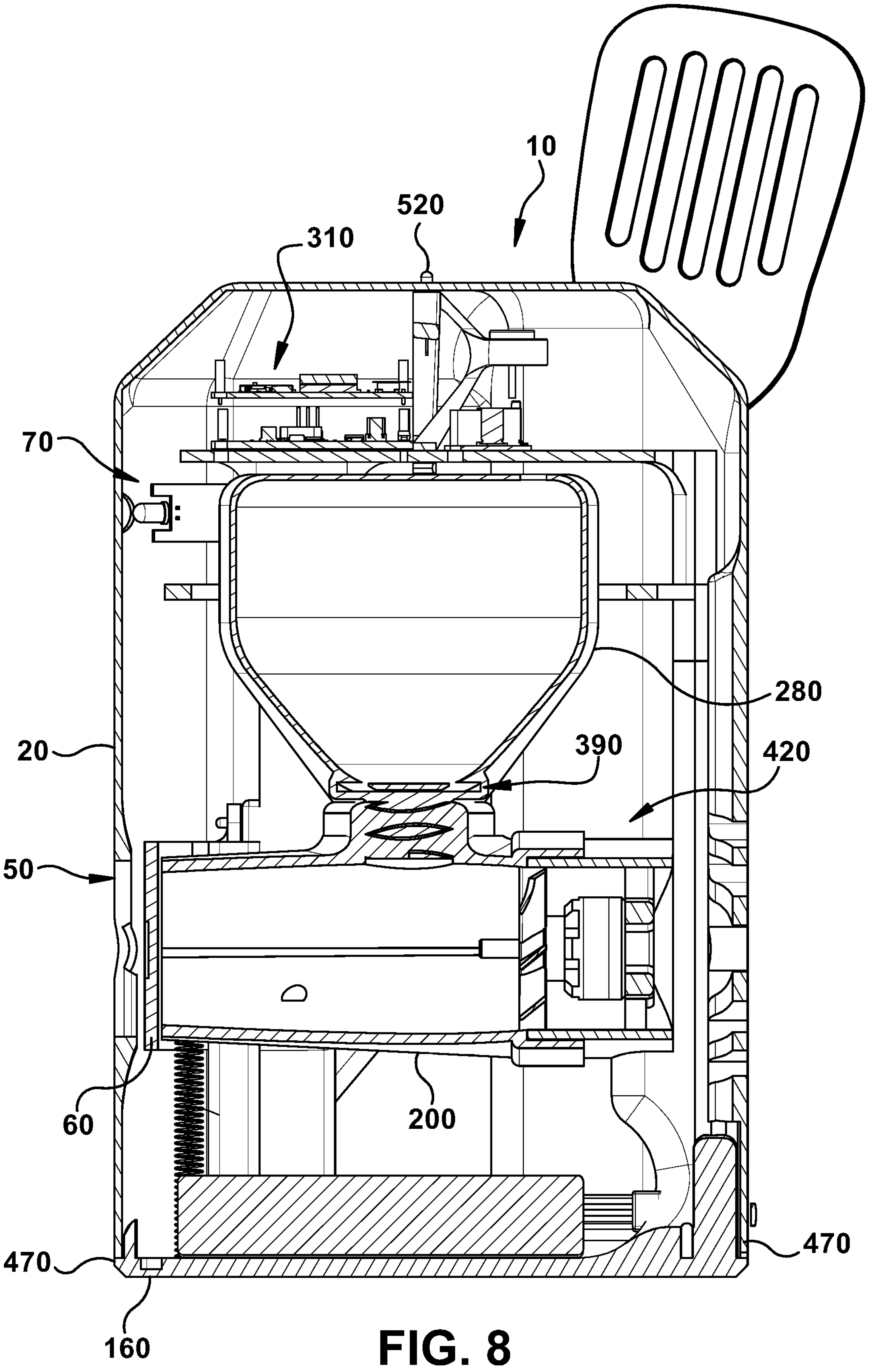
FIG. 8 illustrates a cross sectional view of a fire extinguishing system in accordance with an exemplary embodiment.

FIG. 7 and FIG. 8 illustrate cross-sectional views of the example interior configuration of the fire extinguishing system 10. The housing 20 is substantially hollow and defines an interior space for the components of the fire extinguishing system 10. The housing 20 is open at a bottom end and includes a bottom edge 470 configured to mate with a corresponding edge of the base portion 160 such that the housing can be easily removed by lifting the housing 20 upwards and away from the base portion 160. The interior configuration is designed to be compact and minimize unused space so that the fire extinguishing system 10 is easily portable and has a relatively small footprint for placement on a surface, such as a countertop. The components are arranged so that the weight is proportionally distributed, thereby mitigating a top-heavy device. Moreover, the weight distribution is such that the fire extinguishing agent can be effectively expelled from the fire extinguishing system 10 at high speed while the housing 20 is maintained in an upright position.

In operation, the fire extinguishing system 10 is positioned proximate a fire hazard, such as a cooktop. For instance, the fire extinguishing system can sit on a countertop next to the cooktop with the opening 50 of the housing 20 facing towards the cooktop. Alternatively, the fire extinguishing system 10 can be configured for mounting to a nearby wall or to an overhead structure, such as a hood. When the fire extinguishing system 10 has its on/off switch 130 in the on position, one or more sensors, such as the optical flame detector 70 and/or the gas detector 110 scans the environment for flames and/or smoke. If detected, an extinguishing sequence is activated. During the extinguishing sequence, the housing door 60 is opened. In its normal closed state, the door 60 can be held in the closed position by a pin 500 (FIG. 3). When the door 60 is opened, the pin 500 is released, such as by a servo motor 490. When the pin 500 is released from engagement with the door 60, the door 60 drops to an open position by gravity. The fire extinguishing system 10 can include one or more biasing members, or springs 510 coupled to the door 60. When the door 60 opens, the biasing members 510 provide for a controlled opening to mitigate jams and increase responsiveness of the door 60. Padding, such as foam, (not shown) can also be added to the base portion 160 to cushion the door 60 when it drops open.

Once the door 60 is opened, the gate 390 at a bottom portion of the hopper 280 is opened, such as via a servo motor 480, so that the fire extinguishing agent can be released into the expeller 200. At approximately the same time, or prior to the opening of the gate 390, the fan motor 450 is started such that the fan blades 440 are rotated at high speeds. When the fire extinguishing agent enters the expeller 200, the fan assembly 410 operates to expel the fire extinguishing agent from the fire extinguishing system 10 and onto the fire. During testing of the fire extinguishing system 10, the fire extinguishing agent was dispersed about 3-4 feet from the device and shot in intervals of 3 seconds. A 50Ω potentiometer was used to set the speed of the motor. One end of the potentiometer was connected to 5V, while the other end was connected to GND. A wiper was connected to an analog input capable pin. A program mapped the ADC count (voltage) detected at this pin to a pulse width in microseconds for the PWM control pin of the electronic speed controller thus varying the speed of the motor. Due to the power levels involved, spurious operation of the motor is undesirable. Potential solutions include: creating a function that averages multiple ADC readings to produce a more stable output; during setup, retrieving the potentiometer value and storing it in memory; and/or adding a 1 nF or similar valued capacitor between the analog input pin and GND to help reduce voltage fluctuation on the pin. Preferably, all three solutions are applied simultaneously to provide maximum stability.

An alarm can also be activated to notify a user that the fire extinguishing system 10 has been activated. The alarm can include one or more buzzers and/or lights, such as LED 520. The fire extinguishing system 10 can also include Wi-Fi capabilities in order to transmit the alarm(s) and/or device status to a device, such as a smart phone. After a predetermined period of time, the system resets. A watchdog timer can be included as a failsafe to disable the fire extinguishing system 10 if the software hangs or freezes due to any coding errors or due to any faulty hardware conditions. The watchdog timer can count from zero to a predetermined number. If not reset by the time the predetermined number is reached, the watchdog resets the microcontroller.

It is to be appreciated that the fire extinguishing system 10 can assign weights to one or more of the optical flame detectors and gas detector inputs. If one of the inputs is triggered, it adds to an accumulator. When a specified value is reached, the extinguishing sequence is triggered. This can mitigate false positives, i.e. detections of flames and smoke when extinguishing is not needed.

After the fire extinguishing system 10 has been activated and emptied of the fire extinguishing agent, the hopper 280 can be refilled with fire extinguishing agent such that the fire extinguishing system 10 can be used again. In order to refill the hopper 280, the hopper 280 can be removed from the unit and manually refilled. Alternatively, the housing 20 can be removed and the fill opening 340 at the top of the hopper 280 can be accessible such that the user could simply refill the hopper 280 through the opening 340. Further, the fire extinguishing system 10 may alternatively include pre-filled, disposable hoppers or cartridges filled with the fire extinguishing agent, thereby allowing the user to remove and replace the empty hopper or cartridge during the refill process.

It is to be appreciated that the expeller can be configured in a variety of ways. For instance, the expeller could include a rotatable dish housed within a base. The rotatable dish can be powered by a motor, such as a brushless DC motor to spin the dish at high speeds. The fire extinguishing agent can be dispensed into the dish from the hopper. When the dish spins, the fire extinguishing agent is flung from the dish and towards the fire via an exhaust funnel. The exhaust funnel includes an exhaust opening at a side portion, the exhaust opening being aligned with the opening in the housing such that the fire extinguishing agent is expelled from the fire extinguishing system.

As a result of the present invention, a compact self-contained, reusable, and automatic fire extinguishing system is provided. From the foregoing description, it will be seen that the present invention provides a useful system for extinguishing fires on cooking surfaces and the like. The fire extinguisher is design to comply with U.S. regulations: the National Fire Protection Association NFPA 10 standard that regulates portable fire extinguishers; the Underwriters Laboratory UL 299-299D standard that regulates the safety of portable fire extinguishers; the Consumer Product Safety Commission; and individual state fire codes, which vary from state to state.

Throughout the specification and the claims, the following terms take at least the meanings explicitly associated herein, unless the context clearly dictates otherwise. The term “or” is intended to mean an inclusive “or.” Further, the terms “a,” “an,” and “the” are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to “one example,” “an example,” “one embodiment,” “an embodiment,” “example embodiment,” etc., indicate that the implementation(s) of the disclosed technology so described may include a particular feature, structure, or characteristic, but not every implementation necessarily includes the particular feature, structure, or characteristic. Further, repeated use of the phrases “in one example,” “in one embodiment,” or “in one implementation” does not necessarily refer to the same example, embodiment, or implementation, although it may.

As used herein, unless otherwise specified the use of the ordinal adjectives “first,” “second,” “third,” etc., to describe a common object, merely indicate that different instances of like objects are being referred to and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation. This written description uses examples to disclose certain implementations of the disclosed technology, including the best mode, and also to enable any person skilled in the art to practice certain implementations of the disclosed technology, including making and using any devices or systems and performing any incorporated methods.

The invention claimed is:

1. A fire extinguishing system comprising:

a housing;

a hopper provided within the housing, the hopper configured to hold a fire extinguishing agent therein;

an expeller positioned within the housing and below the hopper, the expeller configured to receive the fire extinguishing agent from the hopper and discharge the fire extinguishing agent through an outlet in the expeller; and a fan assembly coupled to the expeller and configured to blow the fire extinguishing agent through the outlet in the expeller.

2. The fire extinguishing system of claim 1, wherein the housing includes an opening and a door configured to cover the opening.

3. The fire extinguishing system of claim 1, further comprising at least one optical flame detector.

4. The fire extinguishing system of claim 3, further comprising at least one gas detector.

5. The fire extinguishing system of claim 1, further comprising a gate coupled to the hopper and configured to open and close an outlet of the hopper.

6. The fire extinguishing system of claim 1, further comprising a controller configured to activate a fire extinguishing sequence upon detection of at least one of a flame and a gas.

7. A fire extinguishing system comprising:

a housing having an opening in a sidewall;

a movable door coupled to the housing to cover the opening;

a hopper configured to store a fire extinguishing agent, the hopper having a hopper outlet;

a movable gate coupled to the hopper to cover the hopper outlet;

an expeller coupled to the hopper, the expeller having an expeller outlet;

a fan coupled to the expeller; and a controller, the controller configured to activate a fire extinguishing sequence, wherein the fire extinguishing sequence includes:

moving the door to uncover the opening;

moving the gate to uncover the hopper outlet; and activating the fan.

8. The fire extinguishing system of claim 7, further comprising at least one optical flame detector and at least one gas detector.

9. The fire extinguishing system of claim 7, further comprising at least one battery configured to provide power to the fire extinguishing system.

10. The fire extinguishing system of claim 7, further comprising at least one alarm configured to notify a user that the fire extinguishing sequence has been activated.

11. The fire extinguishing system of claim 10, wherein the at least one alarm includes at least one light emitting diode and at least one buzzer.

12. The fire extinguishing system of claim 7, further comprising at least one frame configured to support at least one of the hopper, the expeller, and the controller.

13. A fire extinguishing system comprising:

a fan assembly;

an expeller having a first end coupled to the fan assembly and an outlet positioned at a second end, the second end being opposite the fan assembly;

a hopper configured to store a fire extinguishing agent, the hopper fluidly connected to the expeller; and a housing, the housing having an opening that corresponds with the outlet of the expeller.

14. The fire extinguishing system of claim 13, wherein the housing includes at least one of a projection or receptacle configured to receive one or more kitchen utensils for storage.

15. The fire extinguishing system of claim 13, wherein the housing is decorative and interchangeable.

16. The fire extinguishing system of claim 13, wherein the housing includes at least one sensor opening positioned in an upper portion of the housing.

17. The fire extinguishing system of claim 13, further comprising an on/off switch.

18. The fire extinguishing system of claim 13, further comprising a controller configured to activate a fire extinguishing sequence upon detection of a fire.

19. The fire extinguishing system of claim 18, wherein the fire extinguishing sequence includes: opening a door coupled to the housing to expose the outlet of the expeller; opening a gate coupled to the hopper to release the fire extinguishing agent into the expeller; and operating the fan assembly to blow the fire extinguishing agent from the outlet of the expeller towards the fire.

* * * * *